April 17, 1962    M. DANTZIC    3,029,694
OPTICAL INSPECTION ACCESSORY
Filed Sept. 29, 1959
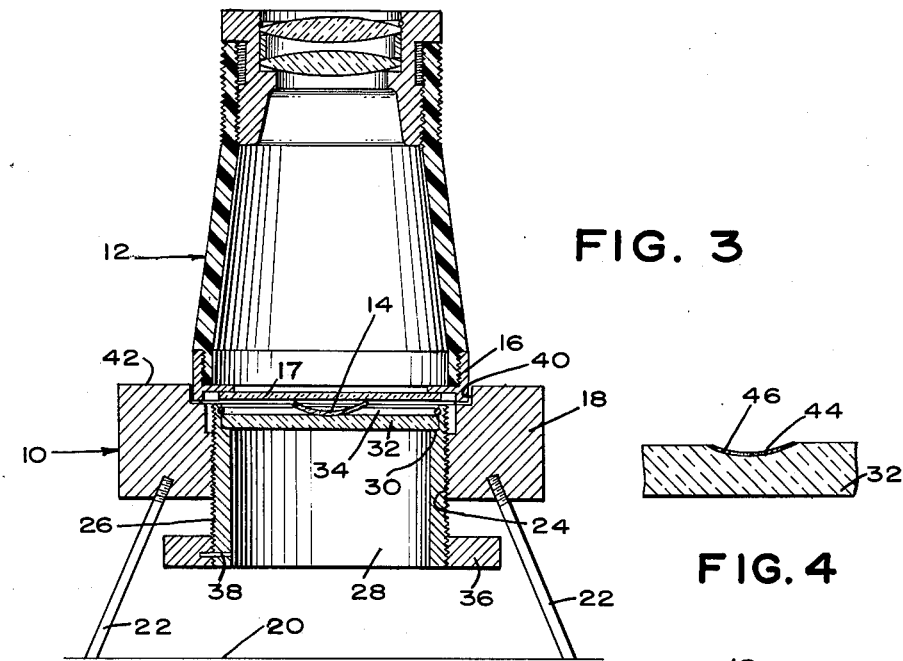
FIG. 3
FIG. 4
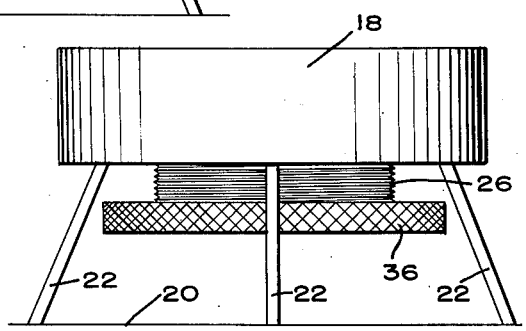
FIG. 1
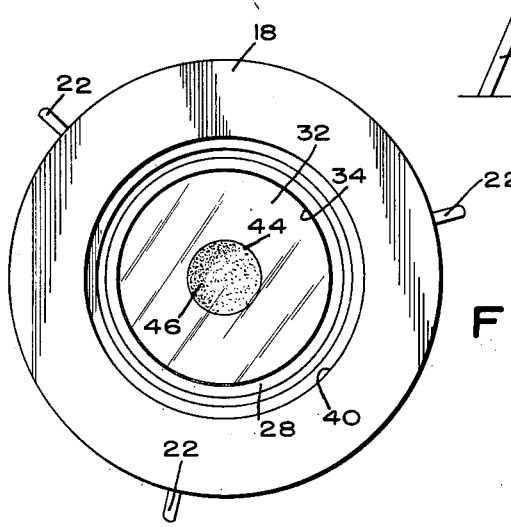
FIG. 2
INVENTOR
MORRIS DANTZIC
BY Raymond W Colton
ATTORNEY

United States Patent Office 3,029,694
Patented Apr. 17, 1962

3,029,694
OPTICAL INSPECTION ACCESSORY
Morris Dantzic, 111 S. Center St., Cumberland, Md.
Filed Sept. 29, 1959, Ser. No. 843,201
5 Claims. (Cl. 88—39)

The inspection of contact lenses during the course of their production is customarily performed with an instrument known as a measuring magnifier. In using such a magnifier, the inspector customarily holds the contact lens against the lower surface of the magnifier with one finger which is quite unsatisfactory and awkward, obscuring light and forming fingerprints on the work. Frequently, the contact lens is damaged as a result of such inspection.

In accordance with the present invention, an accessory has been provided for use with such magnifiers whereby the contact lens or other workpiece can be clamped between the lower surface of the magnifier and a transparent work support which is adjustable relative to the lower surface of the magnifier so as to hold the work in position during inspection without danger of damaging it. Moreover, a maximum amount of light becomes available through the use of this accessory, in the interests of greater accuracy and more rapid manipulation.

Accordingly, the present invention contemplates an optical inspection accessory for use with a magnifier comprising a body member having a surface providing a seat for a magnifier and containing a threaded aperture, a threaded sleeve adjustably received in the aperture for movement towards and from the seat providing surface, a transparent element carried by the upper portion of the sleeve providing a work support, and an operating member extending beyond the body member for adjusting the sleeve. The body member is preferably provided with means for supporting it on a surface, which may assume the form of legs, in which case, three legs are preferable, and the body member contains a counterbore defining the surface which provides a seat for the magnifier whereby the magnifier is restrained against lateral movement. The transparent element preferably contains a work receiving depression and preferably provides a relatively soft work receiving surface to reduce the danger of damage to the work under inspection.

A more complete understanding of the invention will follow from a description of the accompanying drawings wherein:

FIG. 1 is an elevation of an accessory typifying the present invention;

FIG. 2 is a plan view of the accessory depicted in FIG. 1;

FIG. 3 is a sectional elevation of the accessory of FIG. 1 having superimposed thereon a workpiece and a magnifier also depicted in section; and FIG. 4 is a fragmentary section of a transparent element providing a work support.

The optical inspection accessory 10 typifying the present invention is depicted in FIG. 3 as supporting a measuring magnifier 12 for inspection of a contact lens 14. The threaded mount 16 of the magnifier carries a transparent scale bearing disc 17, the lower surface of which bears against the contact lens 14 or other workpiece undergoing inspection. The body member 18 of the accessory is suitably supported above a table or other surface 20 by means of three legs 22 and contains a bore or aperture 24, threaded to receive the external threads 26 formed on the periphery of a sleeve 28 whose upper portion provides a shoulder 30 serving to support a transparent element 32 held in position by means of a snap ring 34. To the lower end of the sleeve 28, a knurled ring 36 is secured by means of a pin 38 to provide an operating member extending below the body member 18 for engagement by an operator to adjust the sleeve towards and from the magnifier. In this manner, the workpiece can be clamped lightly between the magnifier and the transparent work support 32 while undergoing inspection. The body member 18 is provided with a counterbore 40 extending below its upper surface 42 to provide a seat for the magnifier which will preclude undesired lateral movement thereof with respect to the accessory.

As best depicted in FIG. 4, the transparent work support 32 which may be formed of glass or other suitable material is provided with essentially plane surfaces except for a concave seat or depression 44 to complement a lens having a 44 diopter outside curve, which is about an average value, so as to provide an adequate seat for the work. A thin layer of adhesive or other coating composition 46 may be applied to the concave seat 44 to prevent injury to the contact lens or other work undergoing inspection.

Whereas only one specific form of the invention has been described with reference to the accompanying drawings, it should not be construed as restrictive beyond the scope of the appended claims.

I claim:

1. An optical inspection accessory for use with a magnifier which has a bottom transparent plate or scale comprising a body member having a surface providing a normally exposed seat for supporting a magnifier and containing an aperture having internal threads, a sleeve having external threads engaging said internal threads adjustably received in said aperture for movement towards and from said surface, a transparent element carried by the upper portion of said sleeve proximate to said surface providing a work support, and an operating member extending beyond said body member for adjusting said sleeve relative to said body member for clamping work between said support and the bottom transparent plate or scale.

2. An optical inspection accessory as set forth in claim 1 wherein said body member is provided with means for supporting it on a surface.

3. An optical inspection accessory as set forth in claim 1 wherein said transparent element contains a work receiving depression.

4. An optical inspection accessory as set forth in claim 1 wherein a relatively soft work receiving surface is provided on the upper portion of said transparent element.

5. An optical inspection accessory as set forth in claim 1 wherein said body member contains a counterbore defining said surface.

References Cited in the file of this patent

UNITED STATES PATENTS

| 42,843 | Ellis | May 24, 1864 |
|---|---|---|
| 198,542 | Heath | Dec. 25, 1877 |
| 1,804,105 | Martens | May 5, 1931 |
| 2,312,488 | Rowland | Mar. 2, 1943 |
| 2,870,674 | Mize | Jan. 27, 1959 |

OTHER REFERENCES

"Industrial Optical Aids to Assist You in Building a Better Products," by Bausch & Lomb Optical Co., Rochester 2, N.Y.; Catalog No. 81-34-35-01.